United States Patent [19]

Meyer

[11] 3,812,557

[45] May 28, 1974

[54] HOLDING CLAMP

[75] Inventor: Lawrence L. Meyer, Northville, Mich.

[73] Assignee: Eaton Corporation, Cleveland, Ohio

[22] Filed: Feb. 5, 1973

[21] Appl. No.: 329,777

[52] U.S. Cl. .......... 24/263 A, 73/141 A, 317/234 A

[51] Int. Cl. .......................... A44b 21/00, G01l 1/04

[58] Field of Search ...... 317/234 A, 240, 61, 234 P; 24/263 PJ, 263 A, 243 ET, 243 C, 243 B, 243 AE; 338/21; 85/62; 151/21 C; 73/141 A

[56] References Cited

UNITED STATES PATENTS

| | | | |
|---|---|---|---|
| 801,102 | 10/1905 | Quay | 24/263 A UX |
| 1,412,387 | 4/1922 | Clark | 151/21 C |
| 2,311,042 | 2/1943 | Ferguson | 24/263 A UX |
| 2,917,286 | 12/1959 | Deakin | 317/234 A |
| 3,447,118 | 5/1969 | Ferree | 338/21 |
| 3,661,013 | 5/1972 | Wilcox | 73/141 A |

FOREIGN PATENTS OR APPLICATIONS

| | | | |
|---|---|---|---|
| 697,213 | 9/1953 | Great Britain | 317/234 A |

*Primary Examiner*—Donald A. Griffin
*Attorney, Agent, or Firm*—Teagno & Toddy

[57] ABSTRACT

A holding clamp for clamping a thyristor between a pair of heat sinks. The clamp includes spaced clamping and base plates on opposite sides of the heat sinks. The plates are held together by a pair of spaced bolts secured to the base plate and in sliding engagement with the clamping plate. A center bolt is in threaded engagement with the clamping plate and aligned with and located between the spaced bolts. A pad is mounted for universal movement on one end of the center bolt and is engaged with a heat sink. A slot is located in the clamping plate and aligned with the axis of the center bolt. Upon rotation of the center bolt, the sides of the slot close an amount corresponding to the clamping force on the thyristor, thereby increasing the torque needed to turn the center bolt within the clamping plate.

11 Claims, 4 Drawing Figures

PATENTED MAY 28 1974

3,812,557

HOLDING CLAMP

BACKGROUND OF THE INVENTION

A thyristor is a disk shaped high current silicon controlled rectifier (SCR) used to regulate electrical power. In use, energy is lost from the thyristor in the form of heat. In order to dissipate the heat it is advantageous to clamp the thyristor between a pair of heat dissipating plates, such as heat sinks. The force used to clamp the thyristor and heat sinks together must be great enough to insure adequate heat transfer from the thyristor to the heat sinks but not enough to crush the thyristor.

A number of holding clamps are available to clamp a thyristor between a pair of heat sinks. These holding clamps are, however, generally expensive and somewhat inconvenient. Most clamps require the tightening of two spaced bolts and the use of a force indicating gauge. Since opposed surfaces of the thyristor must be parallel to the corresponding surfaces of the heat sinks, the use of the two spaced bolts often results in misalignment of the surfaces of the thyristor relative to the mating surfaces of the heat sinks. The misalignment is caused by uneven adjustment of the two bolts resulting in the cocking of one of the surfaces of the thyristor relative to a corresponding surface of the heat sink. Misalignment results in a substantial reduction in the transfer of heat from the thyristor to the heat sinks and a corresponding drop in the efficiency of the thyristor. Further, in replacing thyristors, the problem of using a force indicating gauge is a time-consuming and annoying one. Some holding clamps have built-in force indicating gauges. These gauges, however, add unnecessary expense to the purchase price of the clamp. One clamp has a center bolt located between a pair of spaced bolts. The heat sinks and thyristor are located between the center bolt and another portion of the clamp. Tightening of the center bolt, which is axially aligned with the thyristor, greatly reduces the problem of parallelism between mating surfaces of the heat sinks and thyristor. This clamp, however, requires the use of force indicating gauges or manuals in order to make sure the proper force is exerted on the thyristor. The gauge or manual is often misplaced or unavailable resulting in unnecessary delays in clamping the thyristor between the heat sinks.

SUMMARY OF THE INVENTION

It is accordingly an object of the present invention to provide a holding clamp which can be tightened by a skilled mechanic to a predetermined clamping force without the use of a built-in gauge, a reference manual or the like.

This object is accomplished by the provision of means, integral with the clamp, which function automatically during tightening of the clamping means to create a variable resistance to rotation of the clamping means that increases nonlinearly in magnitude with increases in the magnitude of the applied clamping force. The mechanic, sensing the amount of and the sharply increasing resistance to further tightening, is apprised that the proper clamping force has been obtained. In the disclosed embodiment the means creating a variable resistance includes a slot located in a clamping plate. The clamping means is a bolt threaded in the clamping plate and centered relative to the slot. The slot is subject to closure upon bending of the clamping plate to increase the torque needed to turn the bolt. The clamping plate is retained by spaced fasteners on either side of the bolt to a base plate upon which the bolt exerts a force. The force exerted by the bolt on the base plate is related to the degree of closure of the slot. In one environment, the clamping and base plates are located on opposite sides of a pair of heat sinks which sandwich a thyristor. Force is exerted on the heat sinks and thyristor by the rotation of the bolt.

DETAILED DESCRIPTION OF THE DRAWINGS

Figure 2:
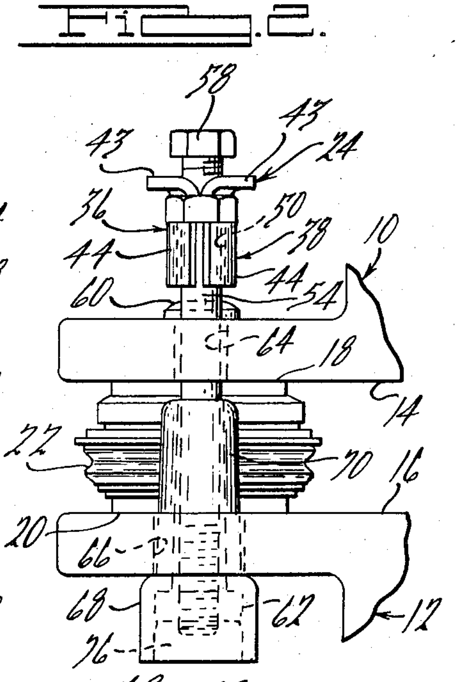
FIG. 2 is a fragmentary side view of FIG. 1.
Figure 1:
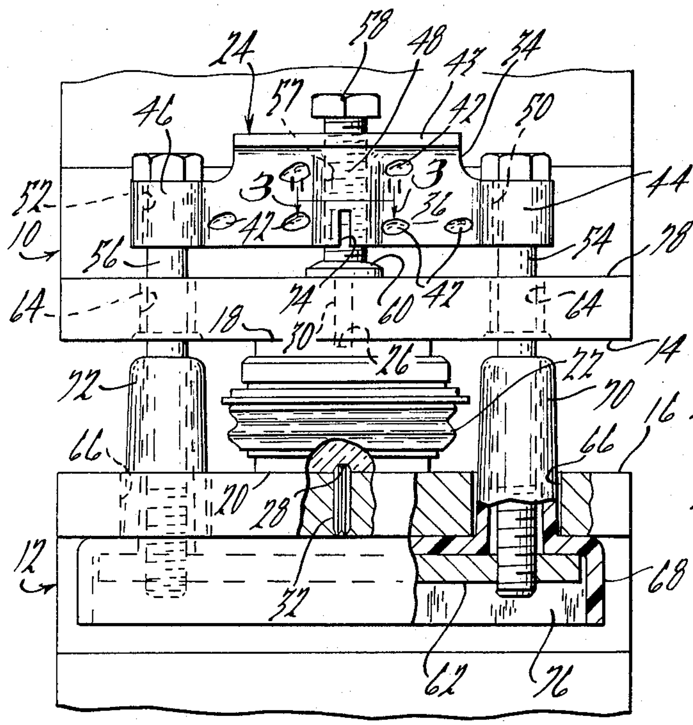
FIG. 1 is a side elevational view, partly in section, of a holding clamp according to the invention in assembly with a thyristor located between a pair of heat sinks.
Figure 3:
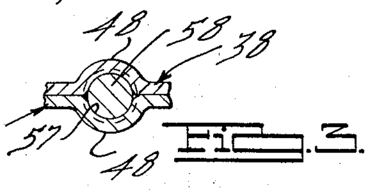
FIG. 3 is a view taken along line 3—3 of FIG. 1.

With reference to FIGS. 1 to 3, a holding clamp 24 is used to force aluminum heat dissipating plates, in the form of heat sinks 10 and 12, toward each other to retain a thyristor 22 therebetween. The heat sinks have parallel surfaces 14 and 16 engaging parallel surfaces 18 and 20 of thyristor 22. The amount of force exerted by holding clamp 24 should be as great as possible in order to maintain the best heat transfer properties between thyristor 22 and heat sinks 10 and 12 but should be less than that which would result in the crushing of thyristor 22. The illustrated clamp is designed to maintain 1,000 lbs., minus 10% plus 30%, of force on thyristor 22.

Thyristor 22 is of a known design and has a pair of aligned holes 26 and 28 which are centered relative to the thyristor and receive centering pins 30 and 32. The centering pins are secured to heat sinks 10 and 12 and are used to locate the thyristor relative to the heat sinks.

Holding clamp 24 includes a semirigid clamping plate 34 made of two metal side plates 36 and 38 which are stamped out of flat sheet stock. The plates are spot welded together at 42. Each side plate includes ears 43, semicircular end protrusions 44 and 46, and a centrally located semicircular protrusion 48. Protrusions 44 and 46 form circular openings 50 and 52. A pair of spaced members in the form of bolts 54 and 56 are in sliding engagement with openings 50 and 52. Center protrusions 48 form a circular opening 57 which is threaded. Clamping means in the form of a center bolt 58 axially aligned with pins 30 and 32 is in engagement with the threads of opening 57. A pad 60, of a known design, such as those used on the ends of "C" clamps, is axially aligned with and secured to one end of bolt 58 and engaged with heat sink 10. Pad 60 is free to swivel and pivot on the end of bolt 58 for universal movement. The threaded ends of bolts 54 and 56 are in threaded engagement with a rigid metal base plate 62 having a rectangular bar configuration. Bolts 54 and 56 project through openings 64 in upper heat sink 10 and openings 66 in lower heat sink 12. An insulator 68 made out of phenolic or a similar electrically insulating, heat stable material defines an opening 76 in which base plate 62 is located and has a pair of cylindrical projections 70 and 72 extending through openings 66 in heat sink 12 and encircling a portion of bolts 54 and 56 and insulating them from heat sink 12.

A slot 74 formed by, for example, a saw cut, is located in each side plate 36 and 38 across the respective protrusion 48. The slots lie in a common plane with the axis of bolt 58. Slots 74 are cut from the surfaces of side plates 36 and 38 which face thyristor 22.

Clamp 24 may be assembled by locating base plate 62 within opening 76 of insulator 68. Projections 70 and 72 of insulator 68 may thereafter be located within openings 66 of lower heat sink 12. Bolts 54 and 56 are respectively located in openings 50 and 52 of top plate 34 and then passed through openings 64 in heat sink 10, the openings in projections 70 and 72, and then threaded a few turns into base plate 62. Thyristor 22 is centered between heat sinks 10 and 12 by the aid of pins 30 and 32. Bolts 54 and 56 are thereafter further threaded into base plate 62 to draw heat sinks 10 and 12 loosely toward one another to allow for the exertion of the proper force on thyristor 22 by the tightening of center bolt 58 within top plate 34. Bolt 58, which has previously been assembled in clamping plate 34, is thereafter tightened forcing swivel pad 60 against surface 78 of heat sink 10 thereby forcing heat sinks 10 and 12 toward one another and clamping thyristor 22 rigidly therebetween. Pad 60 is free to move on the end of bolt 58 to maintain parallelism between heat sinks 10 and 12. As bolt 58 is tightened, a given force is exerted by heat sinks 10 and 12 onto the surfaces 18 and 20 of thyristor 22 until a point is reached at which further tightening of bolt 58 will undoubtedly result in the shearing of bolt 58.

Figure 4:
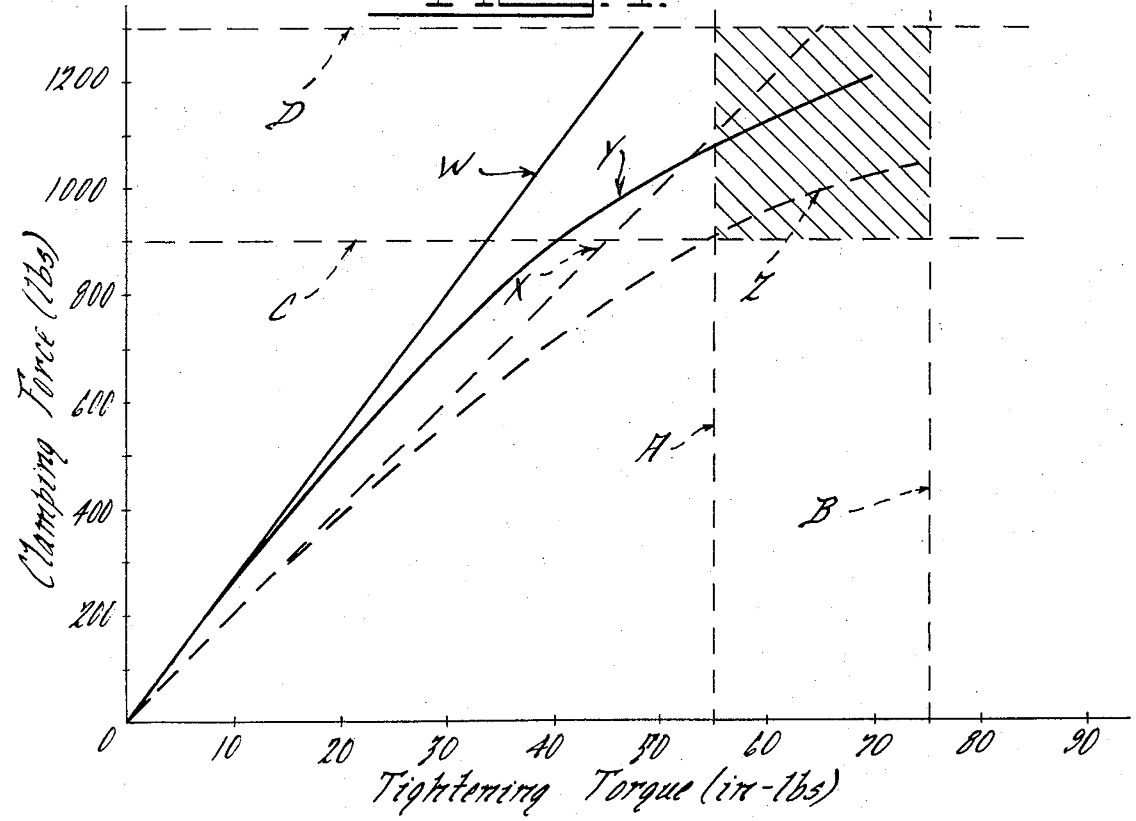
FIG. 4 is a graph of clamping force plotted against tightening torque of the center bolt illustrated in FIG. 1.

FIG. 4 illustrates a graph of the clamping force of holding clamp 24 on thyristor 22 plotted against the torque on bolt 58. The range defined by the dash lines A and B, of approximately 55 in.-lbs. to 74 in.-lbs., indicates the torque at which a mechanic skilled in the art would recognize that bolt 58 is tight and that further tightening of the bolt would result in the shearing of the bolt. As previously noted, it is desirable to put approximately 1,000 lbs., minus 10% plus 30%, of force on thyristor 22. The dash lines C and D represent the range of force usable to clamp thyristor 22, i.e. 900 lbs. to 1,300 lbs. Solid line W is a plot of clamping force versus tightening torque for a ¼-28 UNF Grade 2 bolt (bolt 58 used in the drawings) which is lubricated while line X represents the curve for a ¼-28 UNF Grade 2 bolt that is not lubricated. Both lines W and X are theoretical lines and assume that plates 34 and 62 are rigid and unslotted. By adding properly sized slots 74 to side plates 36 and 38 line W is transposed to become line Y while line X is transposed to become line Z. By the addition of slots 74, the tightening torque at which a skilled mechanic would recognize that bolt 58 was properly tightened would create a force on thyristor 22 which would fall within the range of 900 to 1,300 lbs. In the absence of slots 74 it may be seen by viewing lines W and X that it would be highly unlikely that the proper tightening of bolt 58 would result in the proper force on thyristor 22 and in fact could result in the crushing of the thyristor.

The transposition of lines W and X respectively to Y and Z is caused primarily by slots 74. In tightening bolt 58, clamping plate 34 becomes arcuate placing the upper portion adjacent ears 43 in tension and the lower portion adjacent slots 74 in compression. The compressive stresses cause slots 74 to close thereby increasing the tightening torque needed to turn bolt 58. The closing of slots 74 causes a nonlinear reduction in the rate of increase of the force exerted on thyristor 22 as compared to a rigid top plate. By properly adjusting the width and depth of slots 74 and the size of clamping plate 34 the force-torque curves W and X in FIG. 4 are modified to become curves Y and Z.

What is claimed is:

1. A holding clamp for clamping a heat generating device between a pair of heat dissipating plates, the holding clamp comprising:
   - a clamping plate;
   - a base plate adapted for supporting one of the heat dissipating plates, the clamping and base plates being adapted to be located on opposite sides of the heat dissipating plates;
   - means, including a pair of spaced members interconnecting the clamping and base plates,
     1. for retaining the clamping and base plates relative to one another, and
     2. for holding the heat dissipating plates between the clamping and base plates;
   - a threaded fastener
     1. in threaded engagement with the clamping plate, and
     2. located intermediate the pair of spaced members for engagement with the other heat dissipating plate whereby a force is exerted on the other heat dissipating plate in response to rotation of the threaded fastener relative to the clamping plate; and
   - means defining a slot
     1. traversing the clamping plate,
     2. substantially aligned with the axis of the threaded fastener, and
     3. opening toward the location of the other heat dissipating plate.

2. A holding clamp according to claim 1 further including a pad mounted for universal movement on one end of the threaded fastener and located for engagement with the other heat dissipating plate.

3. A holding clamp according to claim 1 wherein the pair of spaced members are fasteners having threaded ends in threaded engagement with the base plate and another portion in sliding engagement with spaced openings in the clamping plate.

4. A holding clamp according to claim 3 wherein the clamping plate comprises a pair of sheet metal members secured together and defining the spaced openings and a center opening substantially equal distance from the spaced openings and in alignment therewith, the center opening being threaded for threaded engagement with the threaded fastener located intermediate the pair of fasteners.

5. A holding clamp for clamping an object against a base plate, the holding clamp comprising:
   - a clamping plate including
     1. first and second generally elongated plates of similar configuration each having
        a. a pair of protrusions extending across the width of the plate at each end, and
        b. a center protrusion extending across the width of the plate intermediate the end protrusions, the protrusions on each plate defining grooves extending across one of the faces of the plate; and 2. means securing the first and second plates together in abutting relationship along the faces in which the grooves are defined to form a single member having three passages defined by the grooves;

a member located within each end passages in the clamping plate and adapted to be engaged with the base plate; and a fastener in threaded engagement with the center passage.

6. A holding clamp according to claim 5 further including means defining at least one slot in each plate extending between the opposite faces and across at least a portion of each center protrusion.

7. A holding clamp for clamping an object against a base plate, the holding clamp comprising:

a clamping plate;

means, including a pair of spaced members engaged with the clamping plate, 1. for aligning the clamping plate relative to the base plate, and
2. for limiting the maximum distance that the clamping plate can be moved away from the base plate;

clamping means, including a threaded fastener, for exerting a force on the base plate in a direction to move the base plate away from the clamping plate in response to rotation of the threaded fastener relative to the clamping plate while exerting compressive stresses over a portion of the clamping plate, said threaded fastener being 1. in threaded engagement with the clamping plate, and 2. located intermediate the pair of members; and means defining a slot in the clamping plate 1. substantially centered relative to the threaded fastener, and
2. located in a portion of the clamping plate at an angle, other than 180°, relative to the vectorial direction of the compressive stresses.

8. A holding clamp according to claim 7 wherein:

the pair of members are threaded fasteners in sliding engagement with at least one of the plates; and the threaded fastener mounted relative to the clamping plate is in alignment with the pair of threaded fasteners.

9. A holding clamp according to claim 8 wherein the threaded fastener mounted relative to the clamping plate further includes a pad mounted for universal movement and for exerting a force on the base plate.

10. A holding clamp according to claim 3 wherein the clamping plate comprises a pair of sheet metal members secured together and each including spaced outer semicircular openings for receiving the pair of threaded fasteners and a threaded center semicircular opening for receiving the threaded fastener mounted for rotation relative to the clamping plate.

11. A holding clamp according to claim 7 wherein:

the clamping plate comprises a substantially planar member generally coplanar with the lengthwise axis of said threaded fastener; and the slot is in the clamping plate and extends in a direction generally parallel to the axis of the threaded fastener.

* * * * *